Patented May 6, 1952

2,595,335

UNITED STATES PATENT OFFICE 2,595,335

MOLDING POWDERS FROM UREA AND GASEOUS FORMALDEHYDE

Ralph T. K. Cornwell, Rosemont, Pa., assignor to American Viscose Corporation, Wilmington, Del., a corporation of Delaware No Drawing. Application February 26, 1949, Serial No. 78,675

7 Claims. (Cl. 260—17.3)

This invention relates to a method of making a thermosetting composition comprising a dry mixture of formaldehyde resin and a filler.

In the past, compositions of this type have been produced by condensing resin-forming components, for example, urea and formaldehyde, in aqueous solution to form a syrup and then impregnating a suitable filler with the syrup, followed by drying and grinding to the desired particle size. In another procedure an aqueous solution of the resin-forming components is mixed with the filler and condensed in contact with it. The condensates produced using aqueous solutions comprise large amounts of water, and hold the water tenaciously so that considerable difficulty is experienced when it is attempted to drive off the water at temperatures below the temperature at which gelatinization or resinification is initiated. On the other hand, if a molding composition is not sufficiently dry before being placed in a pebble mill or other grinding apparatus, it will cause "gumming up."

The principal object of this invention is to provide a method for producing thermosetting compositions comprising a formaldehyde resin, where in condensation of the resin-forming components is effected in situ in a filler in the presence of a minimum amount of water, and the product comprising the resin-forming condensate comprises only comparatively small amounts of water and can be thoroughly and rapidly dried at temperatures below the gelatinization temperature to produce a mass which can be subdivided in a grinding mill without "gumming up." Other objects and advantages will be apparent from the description of the invention given hereinbelow.

In accordance with the invention, a mass of any suitable filler material is thoroughly impregnated with an aqueous solution of an organic substance which is capable of reacting with formaldehyde to form an initial reaction product which is a thermosetting resin, or resin intermediate, for example an aqueous solution of urea or phenol at adjusted pH which may be acid, alkaline or neutral, depending upon the specific material being condensed with the formaldehyde.

The impregnation is carried out at ordinary, or room temperature, but may be carried out at higher temperatures if short heating periods are used. The excess water is then removed from the mass, as by filtration, pressing or by drying, the moisture content of the mass being reduced until the mass retains a controlled amount of moisture in the range of from 5 to 20% by weight.

The impregnated filler is then placed in a reaction vessel, the vessel is evacuated, and formaldehyde gas is passed into the vessel in the appropriate amount to form the initial condensate, taking into account the number of mols of formaldehyde which react with one mol of the other substance. As an example, approximately 1.5–2 mols of formaldehyde may react with each mol of urea. An excess of formaldehyde above such maximum, or a smaller proportion ranging down to about one mol of formaldehyde for each mol of urea, may be used. Generally, in the case of urea, the preferred proportion of the reactants is three mols of formaldehyde for two mols of urea. The condensation reaction is preferably carried out at a temperature not higher than about 30°–40° C. Other substances, in addition to the urea, may also be present, such as thiourea or resorcinol.

As soon as the formaldehyde contacts the urea-impregnated mass, it is dissolved in the small amount of water present and the condensation then proceeds. The final mass comprising the condensate formed in situ therein contains only a comparatively small amount of adherent water which is very readily driven off by heating the mass at ordinary temperatures for short periods of time. The drying may be accomplished by passing a current of warm air through the mass, temperatures of about 60°–70° C. being satisfactory. The dried mass is then subdivided to particle size, as by grinding in a ball mill or the like, and during the grinding operation there may be added a latent catalyst which is a substance capable of accelerating the polymerization at the molding temperature, such as an acid, an acid salt, or a salt or ester salt capable of liberating an acid which facilitates conversion of the powder to the infusible condition when it is heated at elevated resin-forming temperatures. A particularly advantageous catalyst is the product obtained by condensing hexamethylenetetramine hydrochloride with formaldehyde. Preferably, curing of the formaldehyde-urea condensate is effected at a pH of 4–7.

Any suitable filler may be used, including such fillers as alpha-cellulose, hemicellulose, cotton flock, wood pulp, saw dust, wood flour, cork, leather scrap, powdered horn, casein, asbestos fibers or asbestos powder, paper, paper pulp, linters, nitrated fibrous cellulose, cloth, etc. The proportion of filler in the dried composition embodying the invention is preferably from about 30 to 40%, but may range from 30 to as much as 60%. The proportion of the latent curing catalyst employed is that proportion which causes the hardening to take place at the desired speed, but the usual proportion is from about ½ to about 1% of the weight of the molding composition.

The customary modifiers, such as hot plate lubricants, opacifiers, pigments and other coloring matters may be incorporated also, during the grinding.

The fine ground powder may be used as such, or it may be formed into coarse granules, or into solid blanks or preforms of the proper size for use in various molds. Molded articles may be produced in the usual manner by compressing the composition in a closed mold under a pressure of from one to four tons/sq. in. of projected area, and at a temperature of 270° F. to 330° F.

The following example will illustrate specific embodiments of the invention:

*Example*

154 parts of alpha cellulose were thoroughly impregnated with an aqueous solution of 171.2 parts of urea in 224.4 parts of water. The solution also contained 3.36 parts of hexamethylenetetramine. The impregnated mass was then dried by passing dry air through it until two-thirds of the water was removed, leaving a mass comprising 38.5% pulp, 42.8% urea, and 18.7% of water, plus the hexamethylenetetramine. 175 parts of this mixture were placed in a vessel, the vessel was evacuated to a pressure of about 100 mm. of mercury, placed on a roller mill and attached to a flask containing 13 parts of paraformaldehyde. The flask was rotated on an electric heater as the vessel turned on the roller mill. The paraformaldehyde was heated slowly and decomposed to formaldehyde which entered the evacuated vessel and reacted with the urea. 114 parts of formaldehyde were added to the mixture over a period of about ten hours, the temperature being held between 30–40° C. The pH dropped from 7.8 to 6.5. The mixture was then dried in an air stream, while the vessel was rotated on the roller mill, after which it was ground in a ball mill for five hours, with addition of catalyst. The ground material was then sifted through a 60-mesh screen. The mole ratio of formaldehyde to urea in the final product was about 1.5 and the weight ratio of pulp to urea was about 0.9.

Standard tests on the powder gave the following results:

| | |
|---|---|
| Flow, M | 691 p. s. i. (soft) |
| Set point | 36 sec. |
| pH | 6.2 |

No "gumming up" occurred during the grinding operation. The ground product was a free-flowing powder which could be transformed into an infusible mass by heat and pressure.

Articles, such as button blanks, which were molded from the powder had average water absorption capacity.

Since in practicing the method of this invention, a considerable amount of the water is removed before the initial or intermediate stage of resin-formation, the difficulty experienced heretofore in removing water from the impregnated product, after the reaction, without at the same time causing the resin to "set" is eliminated.

Variations and modifications may be made in carrying out the method of the invention without departing from the spirit and scope thereof, and therefore the invention is not to be limited except as defined by the appended claims.

I claim:
1. In the manufacture of thermosetting compositions, the improved process of preparing dry, fusible, heat-settable powders comprising a resin-forming condensate of formaldehyde and urea which comprises impregnating a pulp of filler material with an aqueous solution of urea, dehydrating the impregnated mass to a controlled moisture content of from 5 to 20% by weight, contacting the mass with gaseous formaldehyde to produce the resin-forming condensate in situ in the filler, drying the impregnated mass at a temperature of about 60°–70° C., said filler material comprising 30 to 60% by weight of the dried mass, and subdividing the dried mass to particle size to obtain a molding powder capable of being molded to an infusible condition under heat and pressure.

2. A method as in claim 1, wherein 0.5 to 1.0% of a latent curing catalyst is incorporated in the mass during the subdividing step.

3. In the manufacture of thermosetting compositions, the improved process of preparing dry, fusible, heat-settable powders comprising a resin-forming condensate of formaldehyde and urea, which comprises impregnating a pulp of filler material with an aqueous solution of urea, dehydrating the impregnated mass to a controlled moisture content of from 5 to 20% by weight, contacting the mass with gaseous formaldehyde at 30 to 40° C. to produce the resin-forming condensate in situ in the filler, drying the mass at a temperature of about 60° to 70° C., said filler material comprising 30 to 60% by weight of the dried mass, and subdividing the dried mass to particle size to obtain a molding powder capable of being molded to an infusible condition under heat and pressure.

4. A method as in claim 3, wherein 0.5 to 1.0% of a latent curing catalyst is incorporated in the mass during the subdividing step.

5. In the manufacture of thermosetting compositions, the improved process of preparing dry, fusible, heat-settable powders comprising a resin-forming condensate of formaldehyde and urea, which comprises impregnating a mass of cellulosic filler with an aqueous solution of urea, dehydrating the impregnated mass to a controlled moisture content of from 5 to 20% by weight, contacting the mass with gaseous formaldehyde at 30 to 40° C. to produce the resin-forming condensate in situ in the filler, drying the mass at a temperature of from about 60° to 70° C., said cellulosic filler comprising 30 to 60% by weight of the dried mass, and subdividing the dried mass to particle size to obtain a molding powder capable of being molded to an infusible condition under heat and pressure.

6. A method as in claim 5, wherein 0.5 to 1.0% of a latent curing catalyst is incorporated in the mass during the subdividing step.

7. A method as defined in claim 5, wherein the cellulosic filler is alpha-cellulose.

RALPH T. K. CORNWELL.

REFERENCES CITED

The following references are of record in the file of this patent:

UNITED STATES PATENTS

| Number | Name | Date |
|---|---|---|
| 949,671 | Baekeland | Feb. 15, 1910 |
| 1,630,365 | Weber | May 31, 1927 |
| 2,192,129 | Ellis | Feb. 27, 1940 |
| 2,343,016 | Loughborough | Feb. 29, 1944 |